United States Patent
Park et al.

(10) Patent No.: US 9,736,899 B2
(45) Date of Patent: Aug. 15, 2017

(54) LIGHTING APPARATUS

(71) Applicant: LG ELECTRONICS INC., Seoul (KR)

(72) Inventors: Sunjung Park, Seoul (KR); Ilsoo Yeom, Seoul (KR); Yoonyoung Cho, Seoul (KR); Chulmin Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/761,412

(22) PCT Filed: May 7, 2013

(86) PCT No.: PCT/KR2013/003938
§ 371 (c)(1),
(2) Date: Jul. 16, 2015

(87) PCT Pub. No.: WO2014/112696
PCT Pub. Date: Jul. 24, 2014

(65) Prior Publication Data
US 2015/0366020 A1    Dec. 17, 2015

(30) Foreign Application Priority Data
Jan. 16, 2013 (KR) .................. 10-2013-0004884

(51) Int. Cl.
*F21V 33/00* (2006.01)
*H05B 33/08* (2006.01)
(Continued)

(52) U.S. Cl.
CPC .......... *H05B 33/0845* (2013.01); *F21S 6/002* (2013.01); *F21S 10/06* (2013.01);
(Continued)

(58) Field of Classification Search
CPC ............ H05B 33/0845; H05B 37/0272; H05B 33/0857; H05B 37/0236; F21V 23/0442;
(Continued)

(56) References Cited

U.S. PATENT DOCUMENTS 7,556,398 B2 * 7/2009 Van Der Poel ....... F21V 19/006
                                              362/184
2004/0264187 A1 * 12/2004 Vanderschuit .......... F21S 6/005
                                              362/235
(Continued)

FOREIGN PATENT DOCUMENTS

KR      10-0915896      9/2009
KR    20-2010-0006576    6/2010
(Continued)

OTHER PUBLICATIONS

PCT International Application No. PCT/KR2013/003938, Written Opinion of the International Searching Authority dated Oct. 1, 2013, 1 page.

*Primary Examiner* — Alexander Garlen
(74) *Attorney, Agent, or Firm* — Lee, Hong, Degerman, Kang & Waimey (57) ABSTRACT

A lighting apparatus according to an embodiment of the present invention includes: a main body from which light is emitted; and a stand supporting the main body. The main body includes: an inner body connected to an end of the stand; an outer body disposed to surround the inner body at a position that is spaced apart from an outer circumferential surface of the inner body; and a light emitting module disposed inside the outer body. The outer body is rotatable in a state where the outer body is connected to the inner body.

18 Claims, 11 Drawing Sheets

(51) Int. Cl.
  *F21S 6/00*    (2006.01)
  *F21V 23/04*   (2006.01)
  *H05B 37/02*   (2006.01)
  *F21S 10/06*   (2006.01)
  *F21V 1/10*    (2006.01)
  *F21V 21/06*   (2006.01)
  *H04R 1/02*    (2006.01)
  *F21W 121/00*  (2006.01)
  *F21Y 115/10*  (2016.01)

(52) U.S. Cl.
  CPC ............... *F21V 1/10* (2013.01); *F21V 21/06* (2013.01); *F21V 23/04* (2013.01); *F21V 23/0435* (2013.01); *F21V 23/0442* (2013.01); *F21V 33/0056* (2013.01); *H05B 33/0857* (2013.01); *H05B 37/0236* (2013.01); *H05B 37/0272* (2013.01); *F21W 2121/00* (2013.01); *F21Y 2115/10* (2016.08); *H04R 1/028* (2013.01)

(58) Field of Classification Search
  CPC ...... F21V 21/06; F21V 23/04; F21V 33/0056; F21V 1/10; F21V 23/0435; F21S 10/06; F21S 6/002; F21S 6/00; F21S 6/003; F21S 6/005–6/008; F21W 2121/00; H04R 1/028
  See application file for complete search history.

(56) References Cited

U.S. PATENT DOCUMENTS

| | | | |
|---|---|---|---|
| 2005/0185398 A1* | 8/2005 | Scannell, Jr. | A01G 9/02 362/227 |
| 2006/0120092 A1* | 6/2006 | Sapper | F21S 6/003 362/427 |
| 2009/0207607 A1* | 8/2009 | Haase | F21K 9/13 362/234 |
| 2011/0128723 A1* | 6/2011 | Coleman | F21V 21/096 362/183 |
| 2012/0106154 A1 | 5/2012 | Chang | |
| 2012/0218407 A1* | 8/2012 | Chien | F21S 4/28 348/143 |
| 2013/0286652 A1* | 10/2013 | Chiu | F21S 6/002 362/285 |

FOREIGN PATENT DOCUMENTS

| | | |
|---|---|---|
| KR | 20-0450420 | 10/2010 |
| KR | 20-2012-0001737 | 3/2012 |

* cited by examiner

LIGHTING APPARATUS

CROSS-REFERENCE TO RELATED APPLICATIONS

This application is the National Stage filing under 35 U.S.C. 371 of International Application No. PCT/KR2013/003938, filed on May 7, 2013, which claims the benefit of earlier filing date and right of priority to Korean Application No. 10-2013-0004884, filed on Jan. 16, 2013, the contents of which are all hereby incorporated by reference herein in their entirety.

TECHNICAL FIELD

The present invention relates to a lighting apparatus.

BACKGROUND ART

In general, lighting industries have a long history together with the history of mankind and are closely related with the mankind.

In recent years, lighting industries are being continuously developed, and various studies with respect to a lighting source, a light emitting method, a driving method, improvement in efficiency, and the like are being variously conducted.

Incandescent lamps, discharge lamps, fluorescent lamps, and the like may be used mainly used as light sources that are mainly used for lighting in recent years. The lighting sources are being used for various purposes such as household lightings, industrial lightings, and the like.

Among these light sources, resistive light sources such as the incandescent lamps may have low efficiency and high heat generation. Also, in case of discharge, there are problems in high price or high voltage. Also, in case of the fluorescent lamps, environmental problems due to the use of mercury may occur.

To solve the disadvantages of the light sources, interests with respect to light emitting diode (LED) lightings having many advantages such as efficiency, diversity in color, freedom in design are being increasing.

Such an LED may be a semiconductor device that emits light when a forward voltage is applied. The LED may have a long lifecycle, low power consumption, and electrical, optical, and physical properties that are adequate for mass production. Thus, the LED may be quickly substituted for the incandescent lamps and fluorescent lamps.

In recent years, many attempts have been made to apply a surface light emitting backlight unit to lighting apparatuses such as stands that are mainly used for televisions.

However, most of lighting apparatuses may be provided as products having only a lighting function, and convergence lighting apparatuses that are grafted to IT technologies may be rare.

DISCLOSURE OF THE INVENTION

Technical Problem

The present invention provides a convergence lighting apparatus that are grafted to IT technologies to satisfy consumer demands.

Technical Solution

To achieve the above-described object, a lighting apparatus according to an embodiment of the present invention includes: a main body from which light is emitted; and a stand supporting the main body, wherein the main body includes: an inner body connected to an end of the stand; an outer body disposed to surround the inner body at a position that is spaced apart from an outer circumferential surface of the inner body; and a light emitting module disposed inside the outer body, wherein the outer body is rotatable in a state where the outer body is connected to the inner body.

Advantageous Effects

The lighting apparatus including the above-described constitutions according to the embodiments of the present invention may have following effects.

First, the surface light emitting LED backlight unit that is used for the display device may be adopted for the lighting apparatus to increase the uniformity and brightness of the light. Also, since the lighting apparatus is adjustable in brightness, the lighting apparatus may exert superior functions than the general lighting apparatus such as the existing fluorescent lamps.

Second, the inner body constituting the lighting apparatus according to the embodiments of the present invention may be three-dimensionally rotatable, and the sound outputted from the speaker mounted inside the inner body may have a directional property. Thus, since the user adjusts an angle of the inner body, the sound may be outputted in the desired direction.

Third, in the state where the inner body is fixed, the outer body on which the light emitting module is mounted on an inner side surface thereof may rotate about a single axis. Thus, the rotation angle of the outer body may be adjusted to adjust an amount of light emitted from the light emitting module, thereby maximizing the indirect lighting effect. In addition, the brightness may be adjustable through the mechanical method without controlling an amount of current supplied into the light emitting module or without controlling the turn-on/off of the light source.

Fourth, the separate light emitting module may be mounted on the top surface of the inner body to achieve the direct lighting effect.

Fifth, the sound may be poured from the speaker mounted inside the lighting apparatus to realize the acoustic effect together with the lighting effect. Also, the sound may be linked with the lighting effect to achieve the sound spectrum effect for adjusting the brightness of the light.

Sixth, the brightness of the light may be adjustable, and the sound may be controllable by using the mobile device such as the wireless remote controller or smart phone to adjust the rotation angle of the outer body. Thus, the user may control the lighting apparatus without moving.

Seventh, the color of the lighting may change through the adjustment of the color temperature of the LED light emitting device. Thus, the therapy using the light, i.e., the light therapy effect may be realized.

MODE FOR CARRYING OUT THE INVENTION

Hereinafter, a lighting apparatus according to an embodiment of the present invention will be described in detail with reference to the accompanying drawings.

Figure 1:
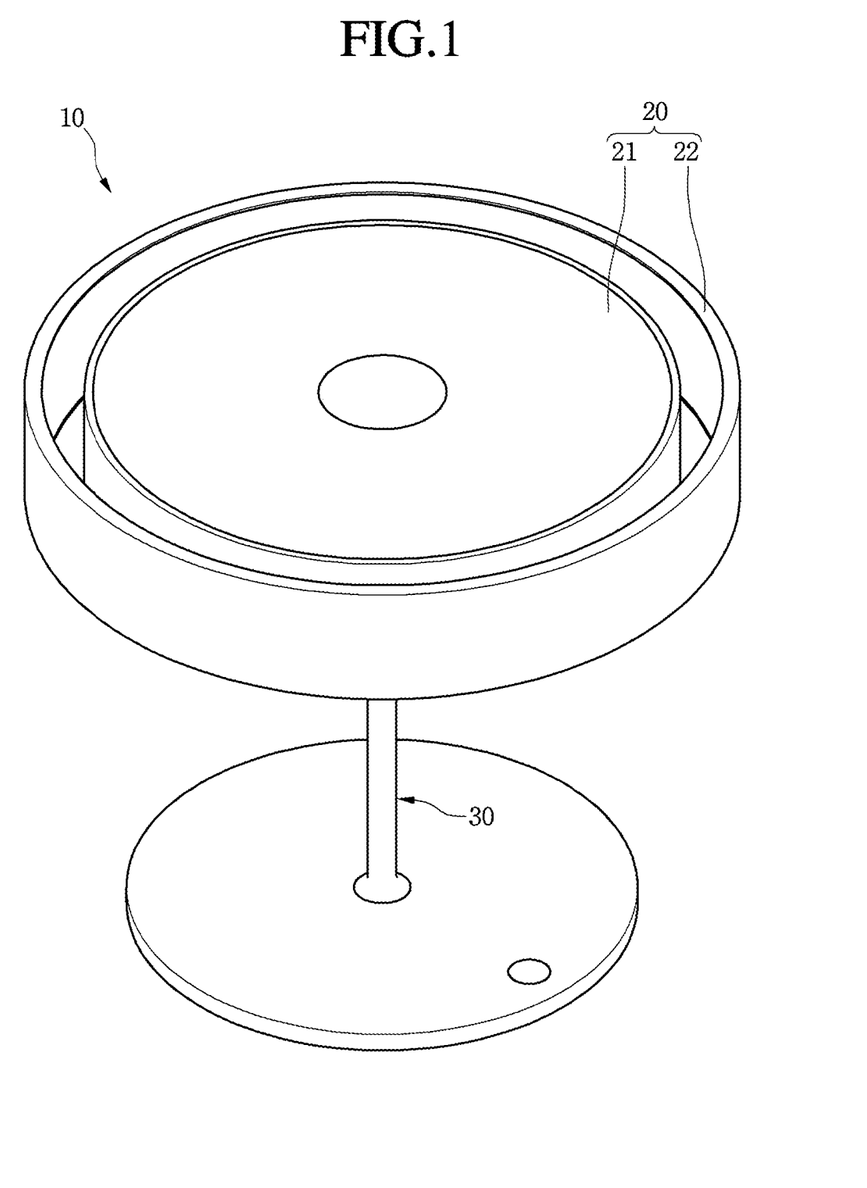
FIG. 1 is a perspective view illustrating an outer appearance of a lighting apparatus according to an embodiment of the present invention.
Figure 2:
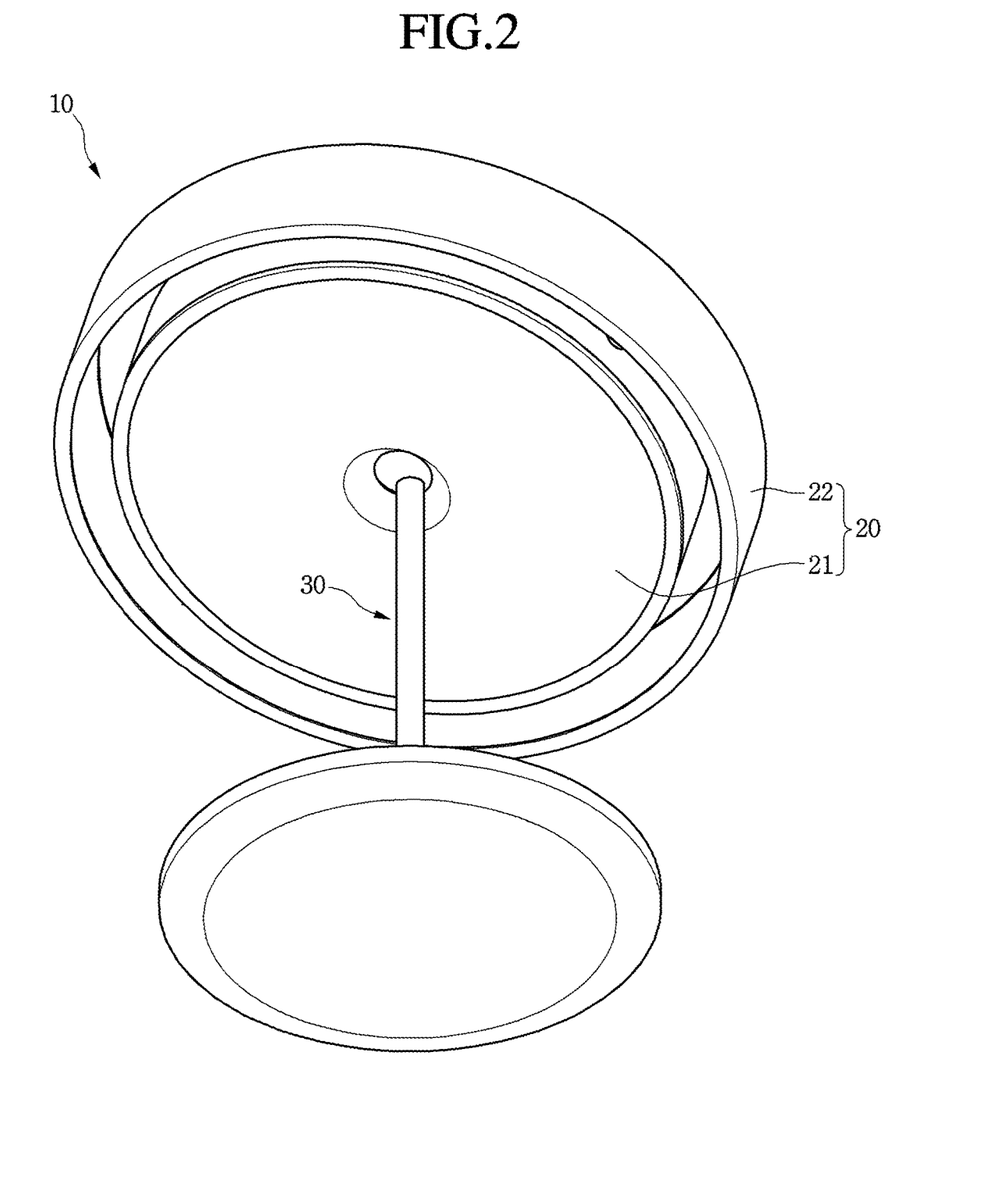
FIGS. 2 and 3 are views illustrating an operation of the lighting apparatus according to an embodiment of the present invention.
Figure 3:
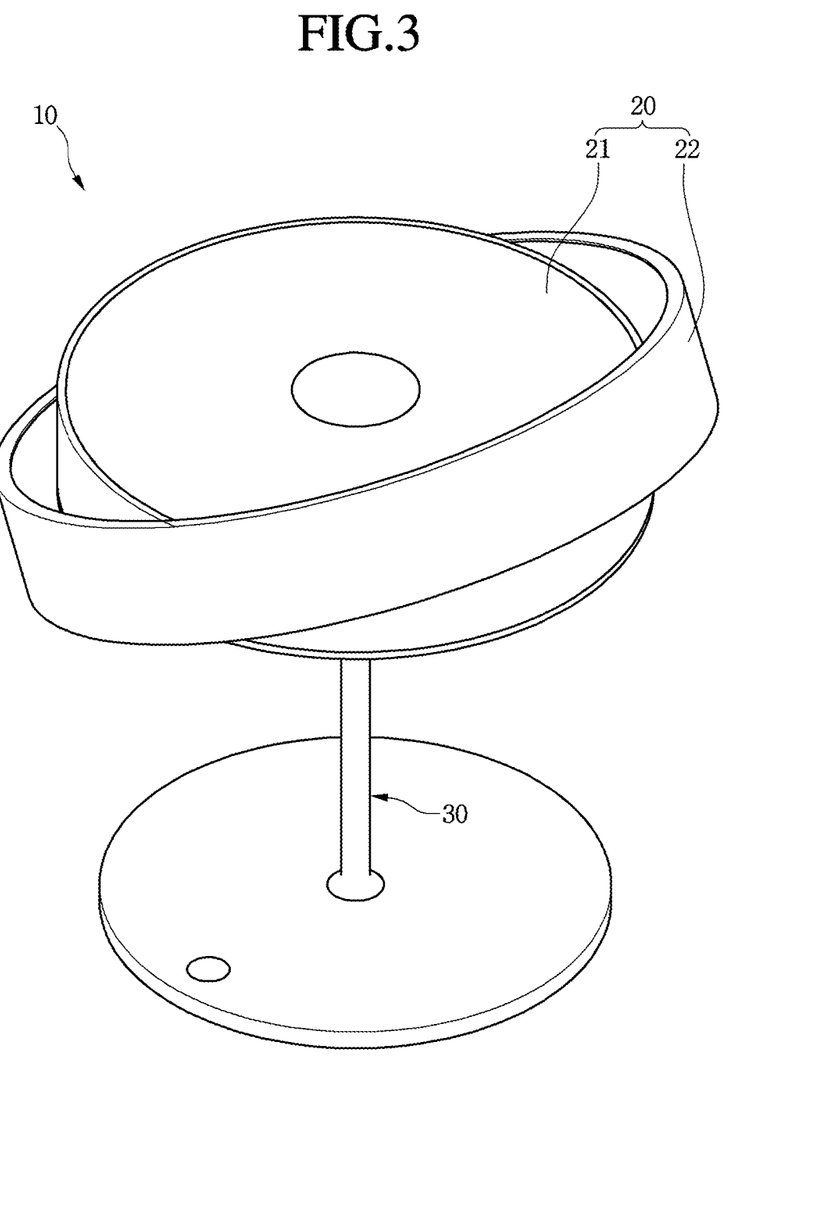

FIG. 1 is a perspective view illustrating an outer appearance of a lighting apparatus according to an embodiment of the present invention, and FIGS. 2 and 3 are views illustrating an operation of the lighting apparatus according to an embodiment of the present invention.

Referring to FIGS. 1 to 3, a lighting apparatus 10 according to an embodiment of the present invention includes a body part 20 through which light is emitted and a stand 30 supporting the body part 20.

In detail, the body part 20 includes an inner body 21 and an outer body 22 having a band shape to surround the outside of the inner body 21.

As illustrated in FIG. 2, the inner body 21 has a structure in which the inner body 21 is three-dimensionally rotatable in a state where the inner body 21 is connected to the stand 30. Also, as illustrated in FIG. 3, the outer body 22 is hinge-coupled to the inner body 21 to rotate about a single axis. Also, a light emitting unit is mounted on each of an inner surface of the outer body 22 and a central portion of a top surface of the inner body 21 to irradiate light. Also, the light emitting unit may be a surface light emitting unit.

Hereinafter, a configuration and function of the lighting apparatus 10 will be described in more detail with reference to the accompanying drawings.

Figure 4:
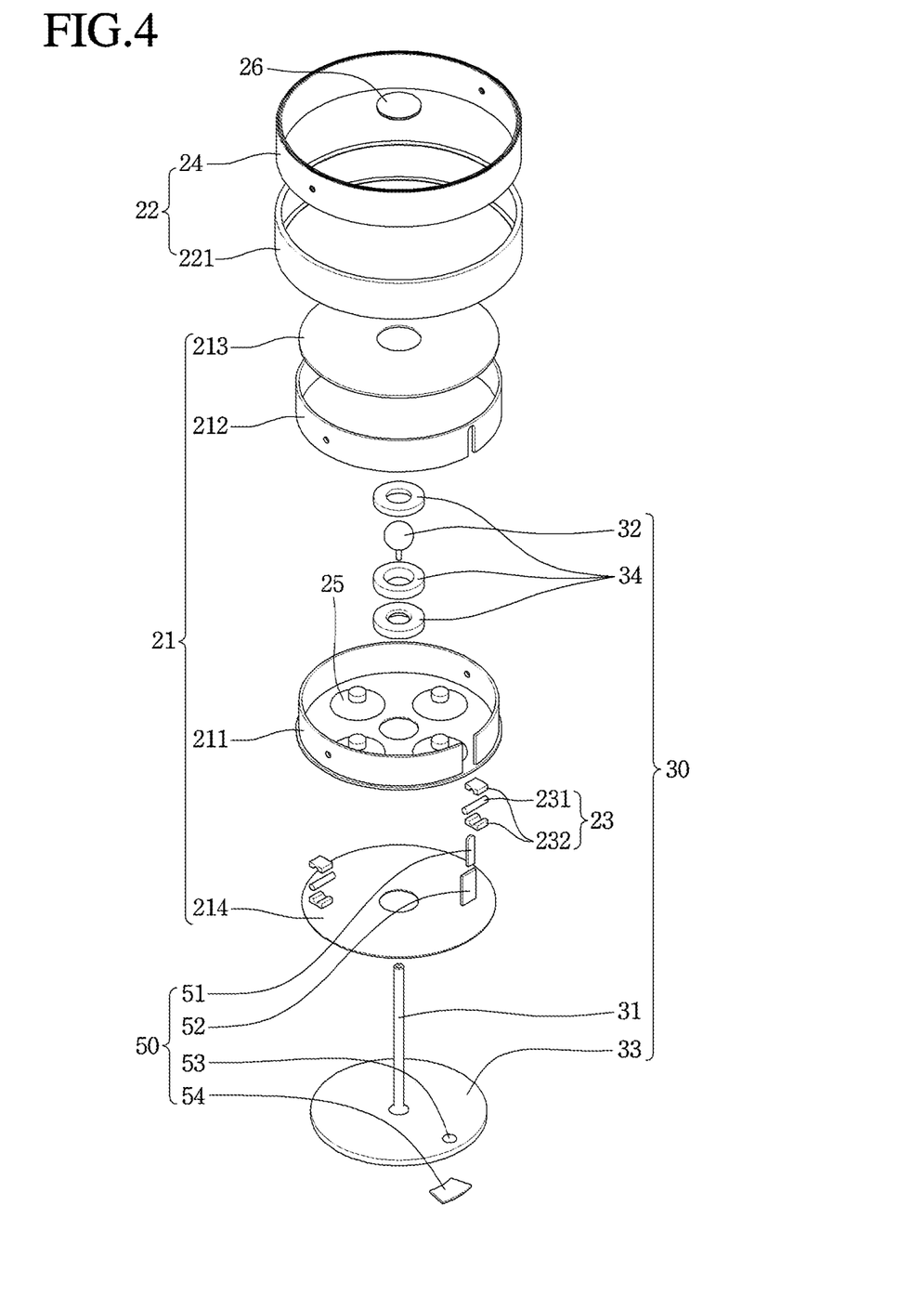
FIG. 4 is an exploded perspective view of the lighting apparatus according to an embodiment of the present invention.
Figure 5:
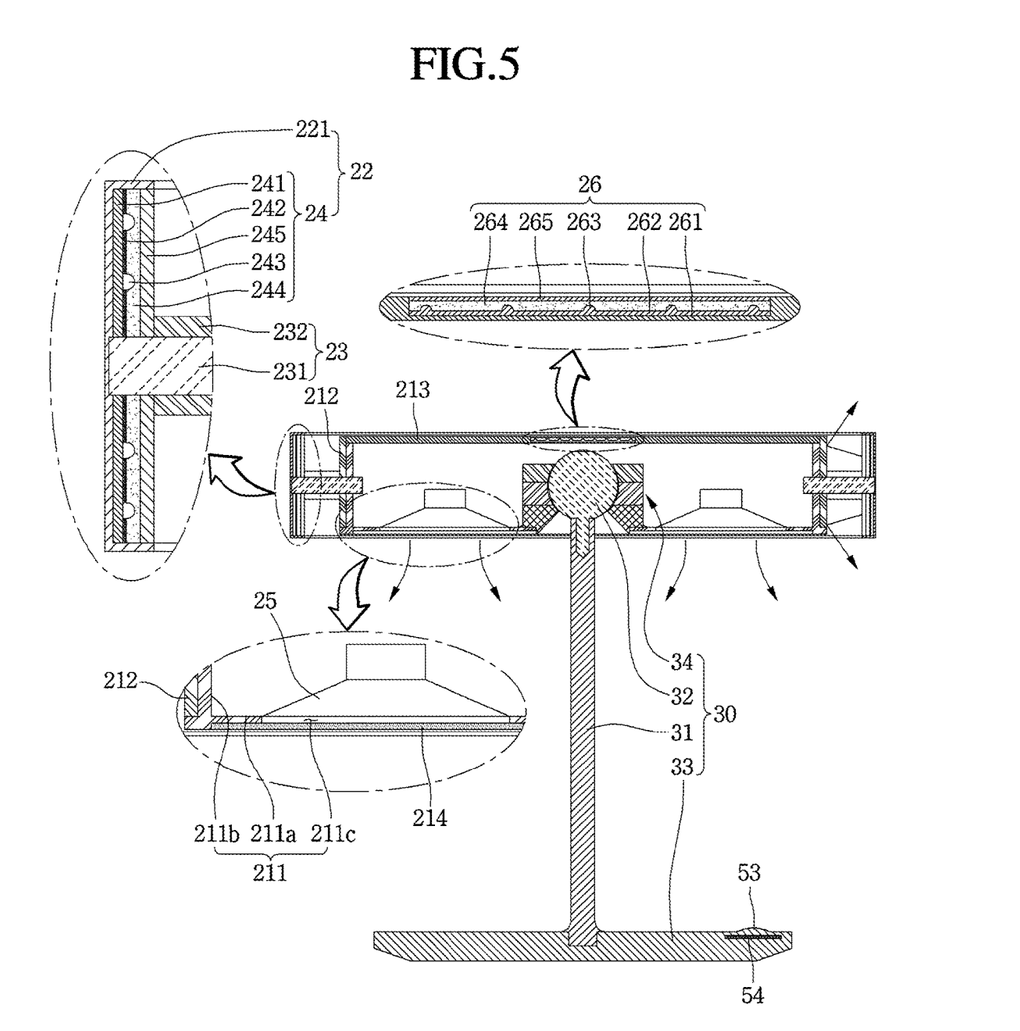
FIG. 5 is a cross-sectional view of an inner structure of the lighting apparatus.

FIG. 4 is an exploded perspective view of the lighting apparatus according to an embodiment of the present invention, and FIG. 5 is a cross-sectional view of an inner structure of the lighting apparatus.

Referring to FIGS. 4 and 5, the lighting apparatus according to an embodiment of the present invention may be largely constituted by the body part 20 and the stand 30.

In detail, the stand 30 includes a base 33 placed on an installation surface, a support 31 vertically extending from a center of a top surface of the base 33, a globular journal bearing 32 connected to an end of the support 31, and a bearing support 34 coupled to an outer circumferential surface of the journal bearing 32.

A power button 53 may be disposed on the top surface of the base 33, and a power button PCB 54 may be disposed inside the base 33. Also, the base 33 may be disposed on a horizontal surface or ceiling.

Also, the body part 20 includes the inner body 21 rotatably connected to the journal bearing 32, an outer body 22 having the band shape to surround the outside of the inner body 21, and a connector 23 rotatably connecting the outer body 22 to the inner body 21. Although the body part 20 has a cylindrical shape, the present invention is not limited thereto. For example, the body part 20 may have a polygonal box shape.

In detail, the inner body 21 includes an inner cover 211 defining a bottom surface and side surface thereof, an outer cover 212 surrounding an external side surface of the inner cover 211, an upper cover 213 covering a top surface of the inner cover 211, and a bottom cover 214 attached to a bottom surface of the inner cover 211. Also, the inner cover 211 includes a bottom part 211a and a side part 211b extending upward from an edge of the bottom part 211a. Also, one or plurality of speakers 25 may be mounted on the bottom part 211a. Also, a speaker hole 211c may be defined in the bottom part 211a covered by the speaker 25 to diffuse a sound outputted from the speaker 25. Particularly, the sound outputted from the speaker 25 may be outputted downward toward the installation surface to collide with the installation surface and thus be diffused in all directions.

Also, a hole through which the support 31 of the stand 30 passes is defined in a center of the bottom part 211a, and the bearing support 34 surrounding the journal bearing 32 is fixed to the bottom part 211a. Thus, the inner body 21 is integrated with the bearing support 34 to rotate together with the bearing support 34.

Also, a hole through which the connector 23 that will be described in detail is defined in each of the side part 211b and the outer cover 212. The bottom cover 214 may be a baffle covering an entire surface of the speaker 25.

A sub light emitting module 26 may be mounted on a central portion of the upper cover 213. One or all of the top surface and the side surface of the upper cover 213 may be mirror-treated to diffuse light emitted from the light emitting module 24 of the outer body 22 in various directions.

In detail, the sub light emitting module 26 includes a substrate 261, a plurality of light sources 263 mounted on the substrate 261, a reflection sheet 262 placed on a top surface of the substrate 261, a light guide plate 264 placed on a top surface of the reflection sheet 262 to realize uniform brightness of light emitted from the light sources 263 or reflected from the reflection sheet 262, and a diffusion sheet 265 including a prism sheet that is placed on a top surface of the light guide plate 264 to enhance brightness of light transmitted from the light guide plate 264, thereby achieving surface light having more uniform brightness. The light source 263 includes an LED package.

The sub light emitting module 26 may have the same structure as a backlight unit that is applied to a television that is released in recent years. Thus, the prevent invention may be characterized in that the backlight unit for a display device is adopted for the lighting apparatus. Since the light emitted from the lighting apparatus has a surface light emitting characteristic having high brightness and is adjustable in brightness, the lighting apparatus may exert superior functions than the general lighting apparatus such as the existing fluorescent lamps.

The outer body 22 may be disposed to be spaced a predetermined distance from the inner body 21 to surround a side surface of the inner body 21.

In detail, the outer body 22 includes a housing 221 having a "⊏" shape to accommodate a main light emitting module 24. Also, the main light emitting module 24 accommodated in the housing 221 may be the same as the sub light emitting module 26. The main light emitting module 24 includes a substrate 241, a reflection sheet 242, a light source 243, a light guide plate 244, and a diffusion sheet 245.

Also, the outer body 22 is rotatably connected to the outside of the inner body 21 by using the connector 23.

In detail, the connector 23 includes a hinge shaft 231 passing through the side surface of the inner body 21 and coupled to the housing 221 of the outer body 22 and a bracket 232 surrounding an outer circumferential surface of the hinge shaft 231. The bracket 232 has one end contacting the main light emitting module 24 and the other end contacting the side surface of the inner body 21. The outer body may be pushed in one direction by the bracket 232 to prevent the outer body 22 from contacting the side surface of the inner body 21. That is, the main light emitting module 24 coupled to the outer body 22 may be maintained by a predetermined distance from the side surface of the inner body 21.

A control panel 51 for inputting an operation command of a user and a panel PCB 52 coupled to a rear surface of the control panel 51 may be mounted on the side surface of the inner body 21. The control panel 51, the panel PCB 52, the power button 53, and the power button PCB 54 may be defined as a controller 50.

The inner body 21 may be rotatable in various directions by the above-described constitutions in the state where the lighting apparatus 10 is installed. Since the inner body 21 is connected to the support 31 by the journal bearing 32, the inner body 21 may rotate in all direction except to an area of the inner body that interferes with the support 31. That is, the inner body 21 may substantially three-dimensionally rotate. Also, the sound outputted from the speaker 25 may have a directional property according to the rotation direction of the inner body 21. That is, since the sound is outputted in a direction in which the bottom part of the inner body 21 is directed, the user may adjust the output direction of the sound in a desired direction.

Also, the outer body 22 may rotate together with the inner body 21 in a state where the outer body 22 is coupled to the inner body 21, and only the outer body 22 may rotate around a single axis with respect to the connector 23 in a state where the inner body 21 is fixed. Thus, the rotation angle of the outer body 22 may be adjusted to adjust an amount of light emitted from the main light emitting module 24. As a result, the brightness may be adjustable through the mechanical method without controlling an amount of current supplied into the light emitting module or without controlling the turn-on/off of the light source. For example, as illustrated in FIG. 1, in the state where the top surface of the outer body 22 and the top surface of the inner body 21 are disposed on the same plane, a small amount of light may be emitted from the lighting apparatus 10 to maximize an indirect lighting effect and a sensibility effect of the user. Also, as illustrated in FIG. 3, an amount of light emitted by increasing the rotation angle of the outer body 22 may increase to adjust brightness in an indoor space.

In addition, since the separate sub light emitting module 26 is disposed on the top surface of the inner body 21, the sub light emitting module 26 may be used for adjusting the brightness in the indoor space according to user's selection. For example, if the lighting apparatus 10 is installed on the ceiling, when the inner body 21 is adjusted in direction, and the sub light emitting module 26 is turned on, the light emitted from the substrate light emitting module 26 may be converged into one point. Thus, when it is required to irradiate relatively bright light onto a specific region so as to read a book, the usefulness of the sub light emitting module 26 may be very high.

Also, since the LED devices are applied as the light sources 243 and 263, a color of the lighting may change through the adjustment of a color temperature of the light source. Thus, therapy using the light, i.e., light therapy effect may be realized.

Figure 6:
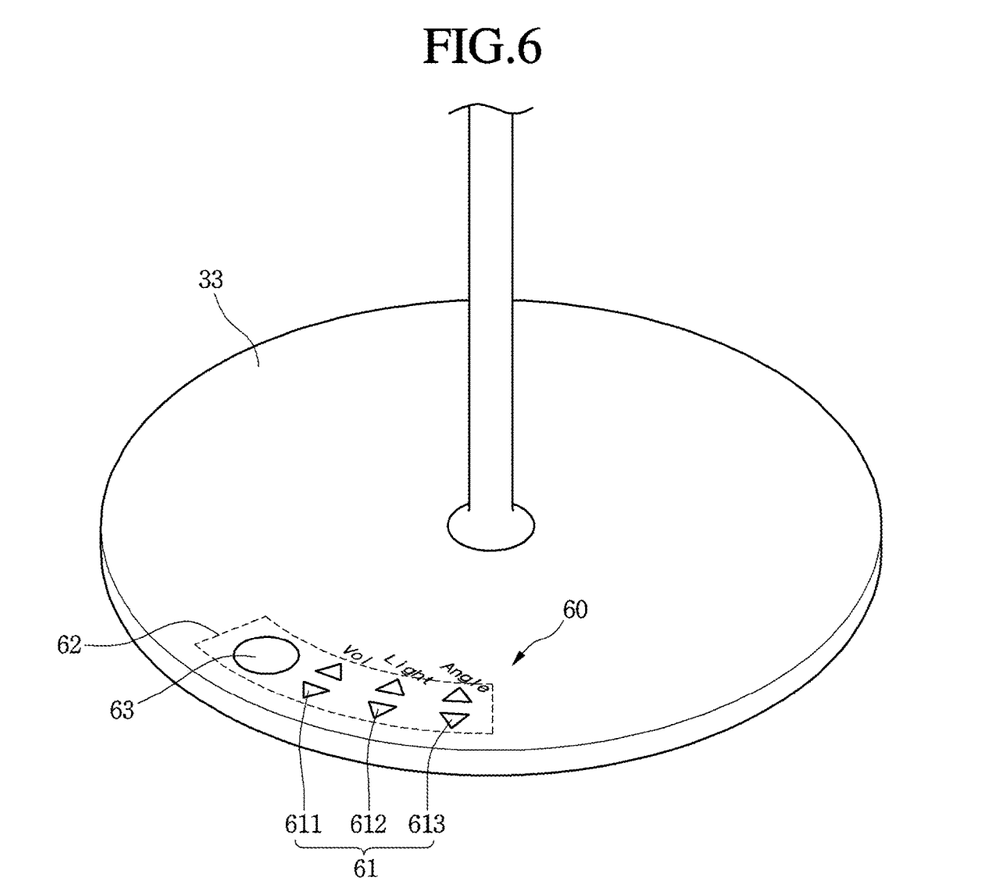
FIG. 6 is a view of a controller according to another embodiment of the present invention.

FIG. 6 is a view of a controller according to another embodiment of the present invention.

Referring to FIG. 6, unlike the foregoing embodiment in which the control panel 51 and the power button 53 are disposed to be spaced apart from each other, according to the current embodiment, a control panel and a power button may be concentratedly disposed on one position.

In detail, a controller 60 according to the current embodiment is disposed on a base 33. Also, a control panel 61 and power button 63 constituting the controller 60 may be disposed on one PCB 62. Also, the control panel 61 may include a volume adjusting button 611 for adjusting intensity of a sound outputted from a speaker 25, a brightness adjusting button 612 for adjusting intensity of light, and an angle adjusting button 613 for adjusting a rotation angle of an outer cover 22. A function and operation of the angle adjusting button 613 will be described below in more detail with reference to the accompanying drawings.

Also, each of buttons constituting the control panel 61 may include a general switch for inputting a command by being pushed by a user's finger and a capacitive switch using a touch manner.

Figure 7:
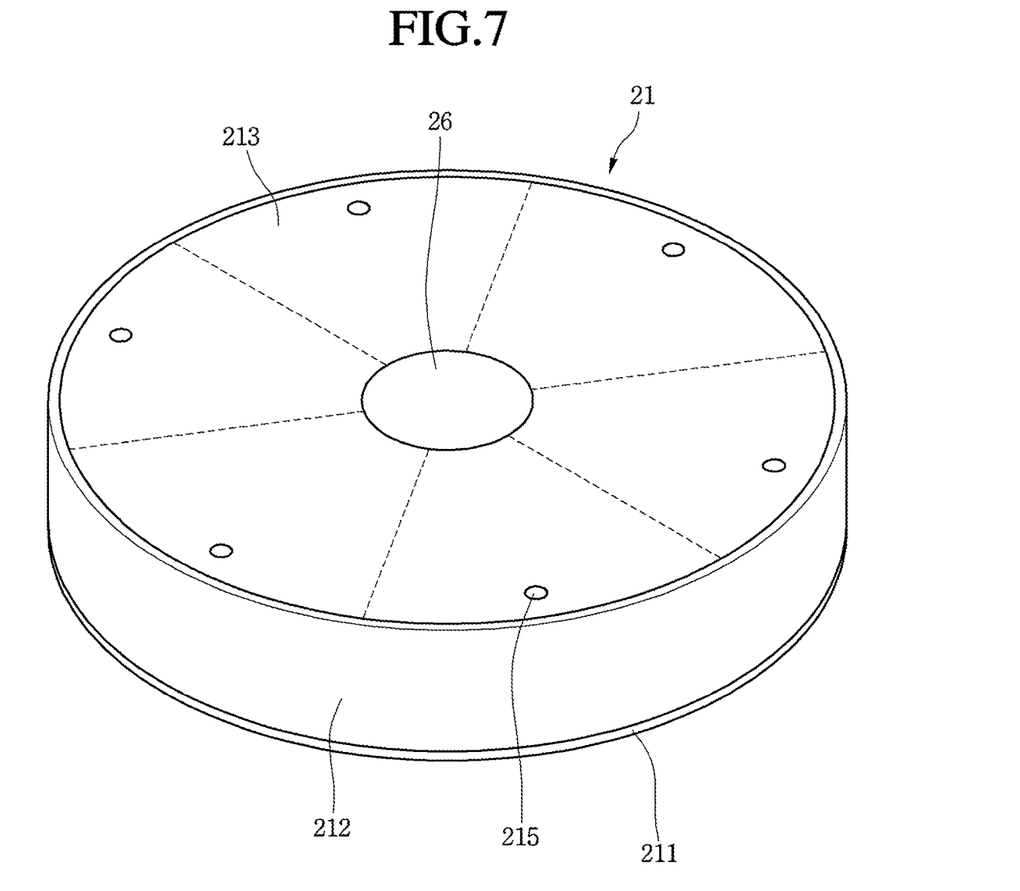
FIG. 7 is a perspective view of a structure in which a light emitting region of a light emitting module is locally adjustable.

FIG. 7 is a perspective view of a structure in which a light emitting region of a light emitting module is locally adjustable.

Referring to FIG. 7, the lighting apparatus 10 according to an embodiment of the present invention may have a function in which only a specific area of the light emitting module is turned on or off according to the user's selection.

In detail, the top surface of the inner body 21 may be partitioned into a plurality of local areas in a circumferential direction, and a local power button 215 may be disposed on each of the areas. The local power button 215 may be a capacitive switch. Also, like this, local areas may be partitioned in an inner side surface of the outer body 22 corresponding to the local areas. That is, the outer body 22 may be partitioned into a plurality of local areas by an extension line passing through a center of the top surface of the inner body 21 to partition the top surface. That is, the main light emitting module 24 may be partitioned into the same number as that of local areas formed on the inner body 21. Also, each of the light sources 243 belonging to the corresponding local area may be independently turned on or off by manipulation of the local power button 215 disposed on the corresponding local area.

For example, when the user touches one of the plurality of local power buttons 215, the light source belonging to the corresponding local area may be turned off. Then, when the touched local power buttons is touched again, the light source may be turned on.

Figure 8:
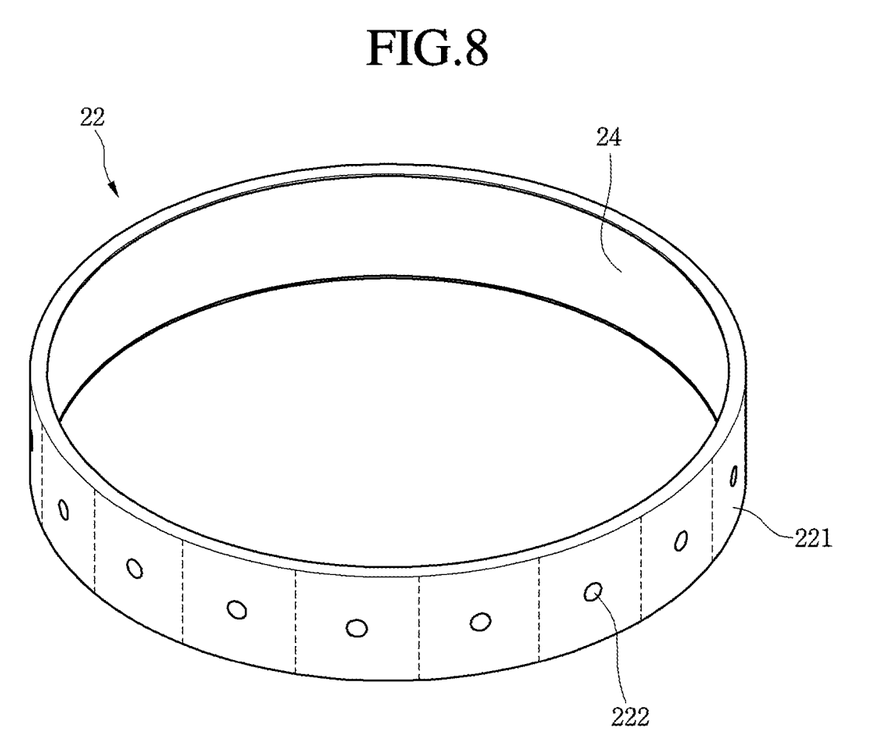
FIG. 8 is a view of a local power button structure according to another embodiment of the present invention.

FIG. 8 is a view of a local power button structure according to another embodiment of the present invention.

Referring to FIG. 8, a local power button 222 according to the current embodiment is disposed on an outer circumferential surface of an outer body 22.

In detail, the outer body 22 is partitioned into a plurality of local areas, and a local power button 222 is disposed on the corresponding area. Also, when the local power button 222 disposed on the corresponding area is touched, a light source 243 belonging to the corresponding area may be turned on or off.

Figure 9:
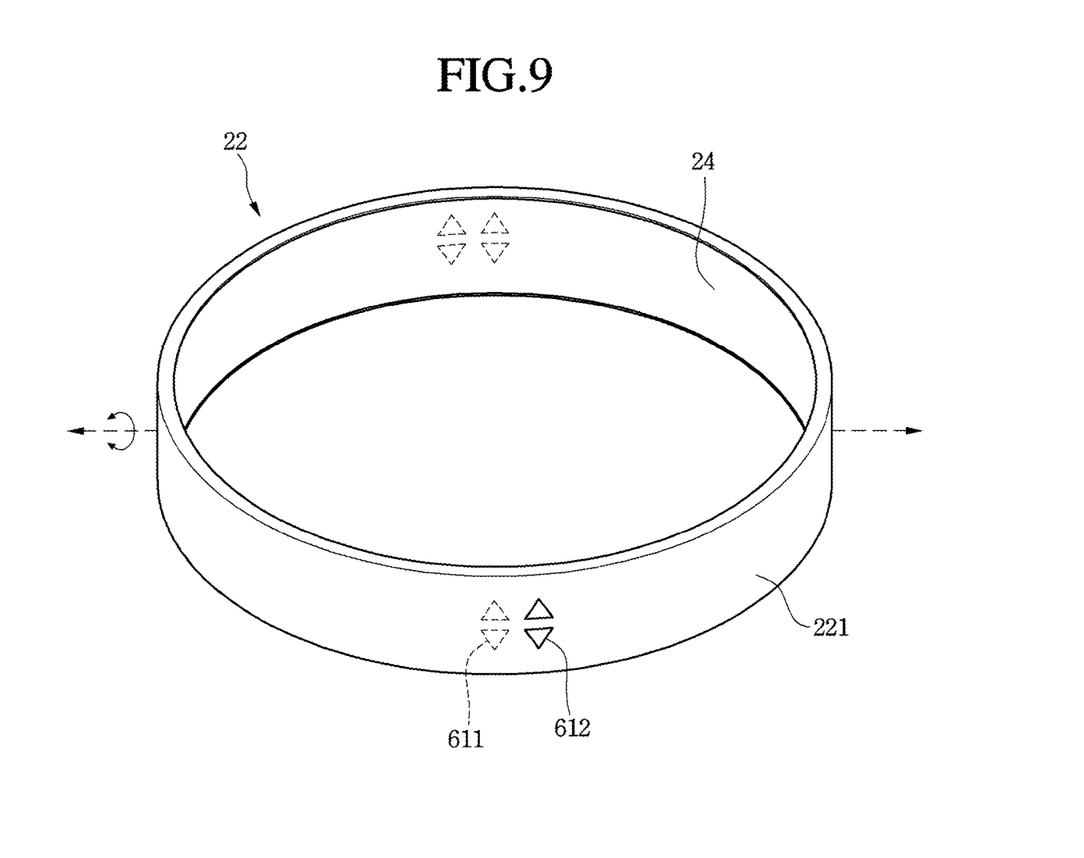
FIG. 9 is a view of a control panel structure according to another embodiment of the present invention.

FIG. 9 is a view of a control panel structure according to another embodiment of the present invention.

Referring to FIG. 9, according to the current embodiment, a portion of button parts constituting a control panel is disposed on an outer circumferential surface of an outer body 22.

In detail, one or all of a brightness adjusting button 612 and volume adjusting button 611 constituting the control panel 61 may be disposed on the outer circumferential surface of the outer body 22. Thus, a user touches the buttons disposed on the outer circumferential surface of the outer body 22 to adjust intensity of light emitted from a main light emitting module 24, i.e., brightness or adjust intensity of a sound outputted from a speaker 25.

Figure 10:
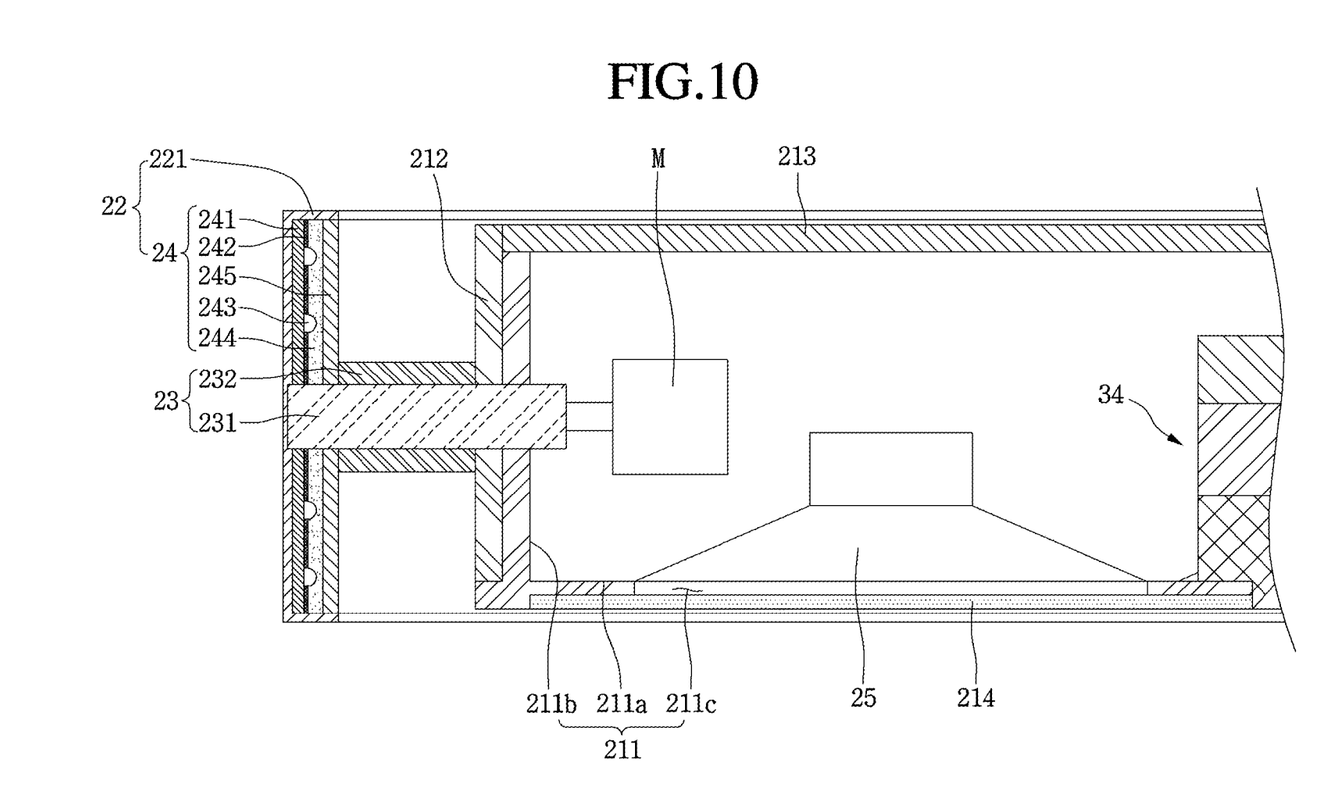
FIG. 10 is a cross-sectional view illustrating a driving mechanism of an outer body constituting the lighting apparatus according to an embodiment of the present invention.

FIG. 10 is a cross-sectional view illustrating a driving mechanism of an outer body constituting the lighting apparatus according to an embodiment of the present invention.

Referring to FIG. 10, the outer body 22 constituting the lighting apparatus 10 according to the present invention may directly rotate by a user's hand. As illustrated in FIG. 10. The outer body 22 may automatically rotate by using a separate driving unit.

In detail, a connector 23 has one end fixed to a housing 221 of the outer body 22 and the other end passing through a side surface of an inner body 21. Also, a driving motor M is disposed inside the inner body 21, and a rotation shaft of the driving motor M is connected to a hinge shaft 231 of the connector 23. Also, a rotating amount of driving motor M may be controlled by using a button disposed on a control panel. That is, the angle adjusting button 613 illustrated in FIG. 6 may be pushed to control the rotating amount of driving motor M and adjust a rotating angle of the outer body 22.

Figure 11:
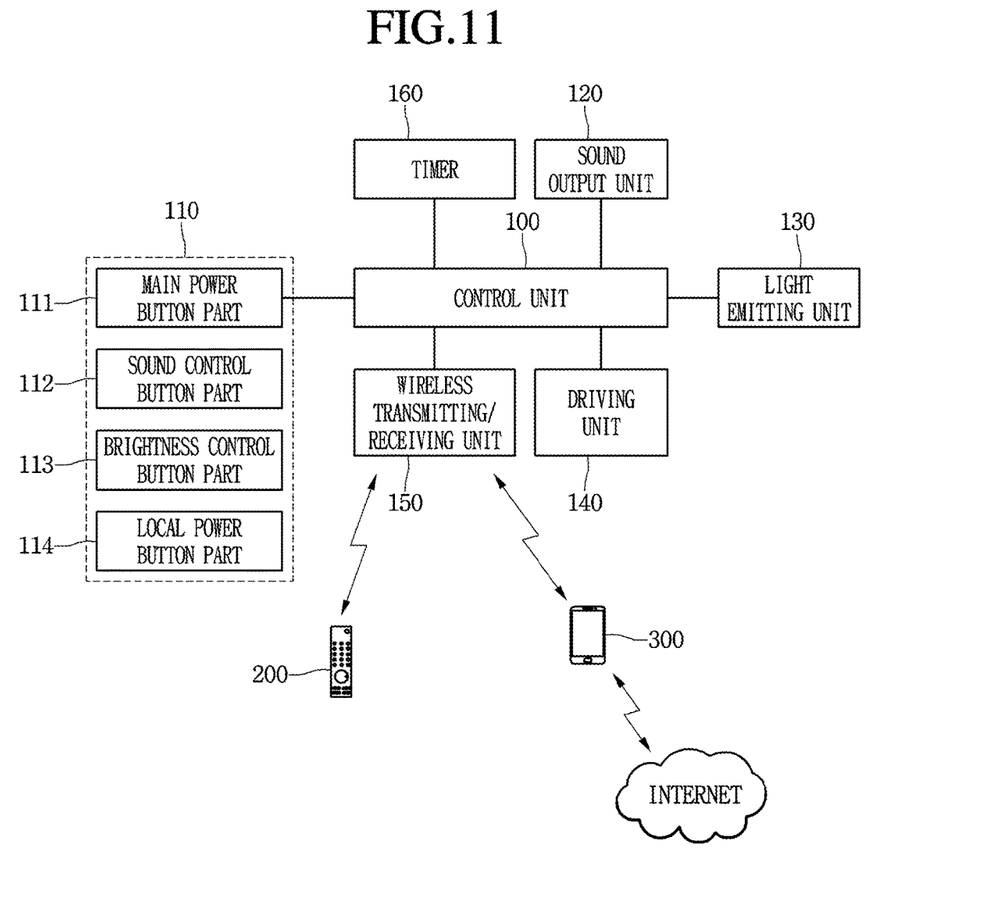
FIG. 11 is a block diagram illustrating a control system of the lighting apparatus according to an embodiment of the present invention.

FIG. 11 is a block diagram illustrating a control system of the lighting apparatus according to an embodiment of the present invention.

Referring to FIG. 11, a control system of a lighting apparatus according to an embodiment of the present invention includes a control unit 100, a command input unit 110 for inputting an operation command, a timer 160 having watch and alarm functions, a sound output unit 120 for outputting a sound, a light emitting unit 130 for emitting light, a driving unit 140 for driving an outer body 22, and a wireless transmitting/receiving unit for wirelessly receiving a signal from a wireless remote controller 200 or mobile device 300.

In detail, the command input unit 110 may include a main power button part, a sound control button part 112, a brightness control button part 113, and a local power button part 114. Also, the main power button part 111 includes the power buttons 53 and 63 that are described above, and the sound control button part 112 includes the volume adjusting button 611 that is described above. Also, the brightness control button part 113 includes the bright control button 613 that are described above, and the local power button part 114 includes the local power buttons 215 and 222 that are described above.

Also, the sound output unit 120 includes the speaker 25 that is described above, and the driving unit 140 includes the driving motor M that is described above. Also, the light emitting unit 130 includes the main light emitting module 24 and the sub light emitting module 26 which are described above.

Also, the wireless transmitting/receiving unit 150 includes an infrared module, a Wi-Fi module, a Bluetooth module, an NFC module, and a ZigBee module. The mobile device 300 includes a smart phone, a tablet PC, and the like, through which Internet communication is enabled. Various kinds of communication devices and computers which wirelessly communicate with the wireless transmitting/receiving unit 150 may belong to the mobile device 300.

According to the above-described system, the command input unit 110 may be directly touched to set and change an amount of sound, brightness, a rotating angle of the outer body, and turn-on/off of the light source. In addition, the command may be set and changed as described above through the wireless remote controller 200.

Also, a sound spectrum function in which the light emitted from the light emitting unit 130 varies in brightness by being linked with the amount of sound may be realized. Also, the light source disposed on the specific areas may vary in color temperature to output light having various colors. Also, only the light sources disposed on the specific areas may be controlled to be turned on or off.

Also, the light emitting unit 130 may be turned on or off while the sound signal may be inputted to output a sound through the speaker. Also, the light emitting unit 130 may be turned on or off according to the amount of sound, or a period of the turn on/off of the light emitting unit 130 may vary by being linked with a bit of the sound. In addition, the rotating rate of the outer body 22 may be controlled to vary by being linked with the bit of the sound.

Also, the light emitted from the light emitting unit 130 may vary in intensity, and the rotating angle of the outer body 22 may vary according to an amount of sound outputted from an audio. For example, if the amount of sound increases, the light emitted from the light emitting unit 130 may increase in intensity, or the outer body 22 may increase in rotating angle to increase an amount of light emitted to the surrounding region.

Also, a rising time may be set by using the timer 160. When the preset time arrives, the light emitting unit 130 may be turned on/off, or a specific sound may be played from the sound output unit 120.

Also, application for controlling the lighting apparatus may be installed by using the mobile device such as the smart phone, and then, the application may be executed to control the operation conditions of the lighting apparatus.

What is claimed is:
1. A lighting apparatus comprising:
 a stand including:
  a base; and
  a support vertically extending from a center of a top surface of the base such that a lower end of the support is coupled to the base;
 a main body from which light is emitted, the main body including:
  an inner body coupled to an upper end of the support;
  an outer body surrounding the inner body by being spaced apart from an outer circumferential surface of the inner body;
  a pair of hinge shafts rotatably coupling the outer body and the inner body, the pair of hinge shafts facing each other, each hinge shaft coupling an inner side surface of the outer body and a side surface of the inner body;
  a main light emitting module disposed inside the outer body; and
  a sub light emitting module disposed at a top portion of the inner body,
 wherein the sub light emitting module comprises:
  a substrate;
  a plurality of light sources mounted on the substrate;
  a reflection sheet placed on the substrate;
  a light guide plate placed on the reflection sheet; and a diffusion sheet placed on the light guiding plate; and
one or more speakers mounted at a bottom portion of the inner body opposite the top portion such that sound generated from the one or more speakers is outputted from a lower outer surface of the inner body toward a direction to which the lower outer surface of the inner body faces.

2. The lighting apparatus according to claim 1, wherein the inner body is three-dimensionally rotatable at the upper end of the support while the base is placed on a surface.

3. The lighting apparatus according to claim 2, further comprising a journal bearing rotatably couplinq the inner body to the support.

4. The lighting apparatus according to claim 1, wherein at least one of brightness of light emitted from the main light emitting module, a color of the light, or a number of lighting sources that are turned on varies according to an amount of sound outputted from the one or more speakers.

5. The lighting apparatus according to claim 1, wherein:
the main light emitting module is partitioned into a plurality of local areas; and
a first light source of the main light emitting module belonging to one of the plurality of local areas is independently controlled with respect to a second light source of the main light emitting module belonging to another one of the plurality of local areas.

6. The lighting apparatus according to claim 5, further comprising a local power button for controlling turn on/off of the first and second light sources belonging to the plurality of local areas.

7. The lighting apparatus according to claim 6, wherein the local power button comprises a capacitive switch.

8. The lighting apparatus according to claim 7, wherein the local power button is disposed on at least one of a top or side surface of the inner body or an outer circumferential surface of the outer body.

9. The lighting apparatus according to claim 1, wherein one or more light sources of the main light emitting module and the plurality of light sources of the sub light emitting module comprise a plurality of light emitting diode (LED) devices.

10. The lighting apparatus according to claim 1, further comprising a control panel configured to receive an input of a control command for controlling the lighting apparatus,
wherein the control panel comprises at least one of a power button, a volume adjusting button, a brightness adjusting button, or an angle adjusting button for adjusting a rotating angle of the outer body.

11. The lighting apparatus according to claim 10, wherein each of the buttons comprises a capacitive switch.

12. The lighting apparatus according to claim 10, wherein the control panel is disposed on one of the base of the stand, the side surface of the inner body, or an outer side surface of the outer body, or is separately disposed on several areas of the base of the stand, the side surface of the inner body, and the outer side surface of the outer body.

13. The lighting apparatus according to claim 1, further comprising a driving motor disposed inside the inner body and coupled to the hinge shaft.

14. The lighting apparatus according to claim 1, further comprising a wireless transmitting/receiving unit for receiving a command signal from an external unit,
wherein the wireless transmitting/receiving unit comprises one of a Wi-Fi module, a Bluetooth module, a ZigBee module, a near-field communication (NFC) module, or an infrared module.

15. The lighting apparatus according to claim 1, wherein one or all of top and side surfaces of the inner body is mirror-treated.

16. The lighting apparatus according to claim 1, further comprising a timer configured to turn on or off at least one of the main and sub lighting emitting modules or the one or more speakers at a preset time.

17. The lighting apparatus according to claim 1, wherein at least one the main light emitting module or the sub light emitting module emits light that is changeable in color through adjustment of a color temperature.

18. The lighting apparatus according to claim 1, wherein the inner body is three-dimensionally rotatable and the direction of the output sound is changeable according to rotation of the inner body.

* * * * *